US012811829B2

United States Patent
Kumar et al.

(10) Patent No.: US 12,811,829 B2
(45) Date of Patent: Nov. 24, 2026

(54) GROUP SPARSITY AND IMPLICIT REGULARIZATION FOR MIMO CHANNEL ESTIMATION

(71) Applicant: InterDigital Patent Holdings, Inc., Wilmington, DE (US)

(72) Inventors: Akshay Kumar, Minneapolis, MN (US); Akshay Malhotra, San Jose, CA (US); Shahab Hamidi-Rad, Sunnyvale, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/835,877

(22) PCT Filed: Feb. 3, 2023

(86) PCT No.: PCT/US2023/012320

§ 371 (c)(1),
(2) Date: Aug. 5, 2024

(87) PCT Pub. No.: WO2023/150299

PCT Pub. Date: Aug. 10, 2023

(65) Prior Publication Data

US 2025/0150310 A1 May 8, 2025

Related U.S. Application Data

(60) Provisional application No. 63/306,687, filed on Feb. 4, 2022.

(51) Int. Cl.
*H04L 25/02* (2006.01)
*H04B 7/06* (2006.01)

(52) U.S. Cl.
CPC ....... *H04L 25/0246* (2013.01); *H04B 7/0626* (2013.01)

(58) Field of Classification Search
CPC .................................................. H04L 25/0246
(Continued)

(56) References Cited

U.S. PATENT DOCUMENTS

2013/0070723 A1* 3/2013 Yie ...................... H04B 7/0641 370/329
2020/0074341 A1* 3/2020 He .......................... G06N 5/01
2024/0380450 A1* 11/2024 Ibrahim ............... H04B 7/0695

FOREIGN PATENT DOCUMENTS

WO 2020/192790 A1 10/2020

OTHER PUBLICATIONS

Alexandropoulos et al., "Low Complexity Channel Estimation for Millimeter Wave Systems with Hybrid A/D Antenna Processing", IEEE Globecom Workshops (GC Wkshps), doi: 10.1109/GLOCOMW.2016.7848952, Oct. 1, 2016, pp. 1-6.

(Continued)

*Primary Examiner* — Lihong Yu

(74) *Attorney, Agent, or Firm* — Condo Roccia Koptiw LLP

(57) ABSTRACT

Systems, methods, and instrumentalities are described herein in association with group sparsity and implicit regularization for MIMO channel estimation. For example, a channel matrix (e.g., MIMO channel matrix) may have a group sparse property. The group sparse property may be used in channel estimation applications. For example, the group sparse property in MIMO channel matrices may be used with non-convex operations to perform matrix completion. Matrix completion may be performed to determine an unknown channel matrix, for example, using limited entries (e.g., noisy entries).

16 Claims, 9 Drawing Sheets

(58) Field of Classification Search
USPC .......................................................... 375/260
See application file for complete search history.

(56) References Cited

OTHER PUBLICATIONS

Alkhateeb et al., "Channel Estimation and Hybrid Precoding for Millimeter Wave Cellular Systems", IEEE J. Sel. Topics Signal Process., vol. 8, No. 5, Oct. 2014, pp. 831-846.
Arora et al., "Implicit Regularization in Deep Matrix Factorization", Advances in Neural Information Processing Systems, Oct. 26, 2019, pp. 1-23.
Fang et al., "Millimeter Wave Channel Estimation via Exploiting Joint Sparse and Low-Rank Structures", IEEE Transactions on Wireless Communications, vol. 17, No. 2, doi: 10.1109/TWC.2017.2776108, Feb. 2018, pp. 1123-1133.
Gunasekar et al., "Implicit Regularization in Matrix Factorization", Advances in Neural Information Processing Systems, May 25, 2017, pp. 1-10.
Jain et al., "PCI-MF: Partial Canonical Identity and Matrix Factorization Framework for Channel Estimation in mmWave Massive MIMO Systems", IEEE Open Journal of Signal Processing, vol. 1, 2020, pp. 135-145.
Lee et al., "Channel Estimation via Orthogonal Matching Pursuit for Hybrid MIMO Systems in Millimeter Wave Communications", IEEE Transactions on Communications, vol. 64, No. 6, doi: 10.1109/TCOMM.2016.2557791, Jun. 2016, pp. 2370-2386.
Maki et al., "Graph Regularized Tensor Factorization for Single-Trial EEG Analysis", IEEE International Conference on Acoustics, Speech and Signal Processing (ICASSP), 2018, pp. 846-850.
Nguyen et al., "Low-Rank Matrix Completion: A Contemporary Survey", arXiv: 1907.11705, Jul. 30, 2019, pp. 1-52.
Vlachos et al., "Massive MIMO Channel Estimation for Millimeter Wave Systems via Matrix Completion", IEEE Signal Processing Letters, vol. 25, No. 11, doi: 10.1109/LSP.2018.2870533, Nov. 2018, pp. 1675-1679.
Woodworth et al., "Kernel and Rich Regimes in Overparametrized Models", Proceedings of Thirty Third Conference on Learning Theory, Jul. 27, 2020, pp. 1-31.

* cited by examiner

100

GROUP SPARSITY AND IMPLICIT REGULARIZATION FOR MIMO CHANNEL ESTIMATION

CROSS-REFERENCE TO RELATED APPLICATIONS

The application is the National Stage Entry under 35 U.S.C. § 371 of Patent Cooperation Treaty Application No. PCT/US2023/012320, filed Feb. 3, 2023, which claims the benefit of U.S. Provisional Application 63/306,687, filed Feb. 4, 2022, the contents of which are incorporated by reference in their entirety herein.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, and instrumentalities are described herein in association with group sparsity and implicit regularization for MIMO channel estimation. For example, a channel matrix (e.g., MIMO channel matrix) may have a group sparse property. The group sparse property may be used in channel estimation applications. For example, the group sparse property in MIMO channel matrices may be used with non-convex operations to perform matrix completion. Matrix completion may be performed to determine an unknown channel matrix, for example, using limited entries (e.g., noisy entries).

For example, a wireless transmit/receive unit may be configured to reconstruct an unknown channel matrix. The WTRU may receive an indication indicating a value (e.g., noisy entry) associated with the unknown channel matrix. The indication may be received from a reference signal, such as a de-modulation reference signal (DMRS) or a channel state information reference signal (CSI-RS). The WTRU may be configured to determine a group sparse matrix based on the indicated value. The WTRU may be configured to determine a reconstructed channel matrix, for example, using a non-convex operation and the group sparse matrix. The non-convex operation may be a gradient descent operation. The non-convex operation may be associated with implicit regularization. The WTRU may be configured to send information associated with the reconstructed channel matrix. The information may be a CSI parameter. The CSI parameters may be a rank indicator, a precoder matrix indicator (PMI), a channel quality indicator (e.g., CQI), and/or the like.

DETAILED DESCRIPTION

Figure 1A:
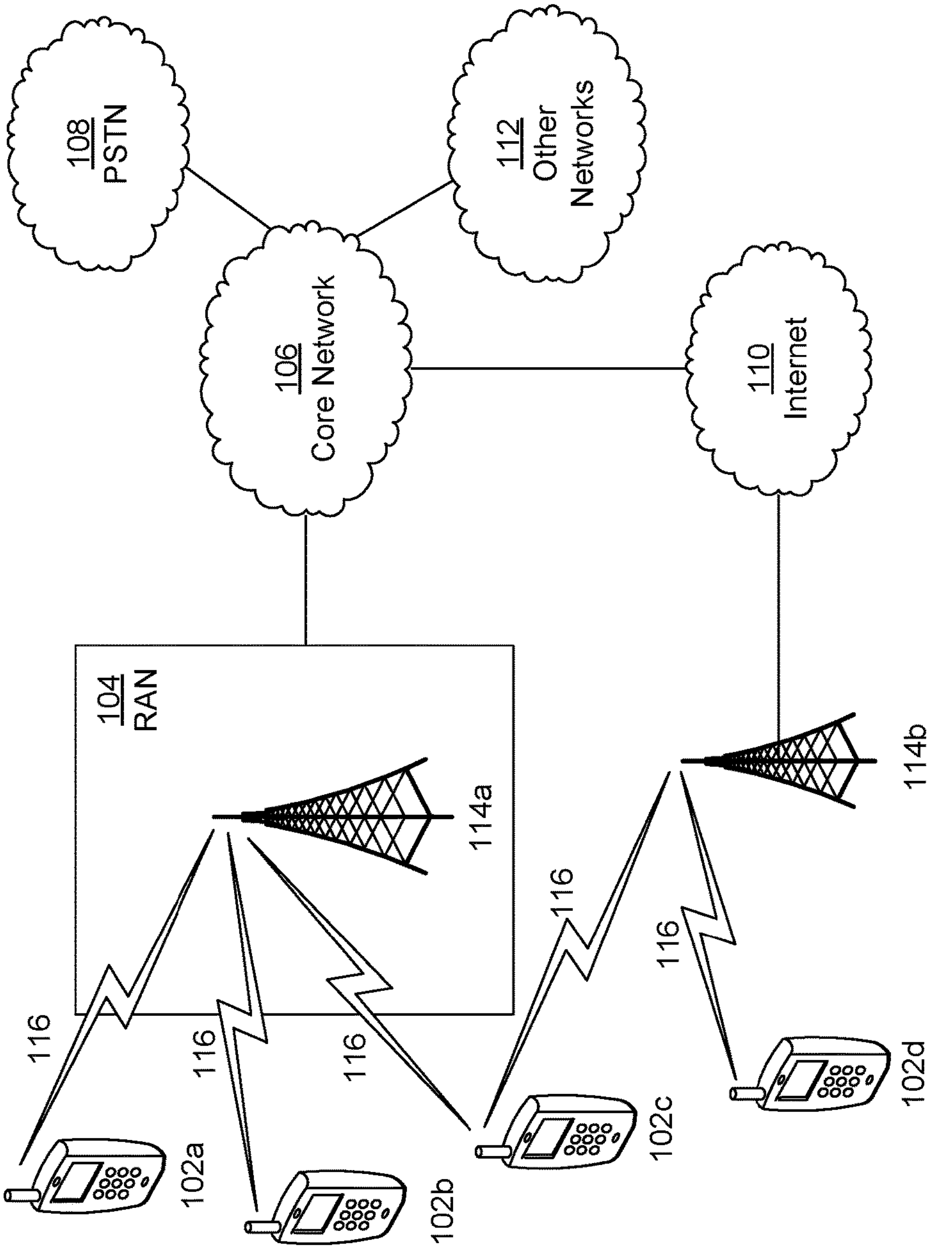
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
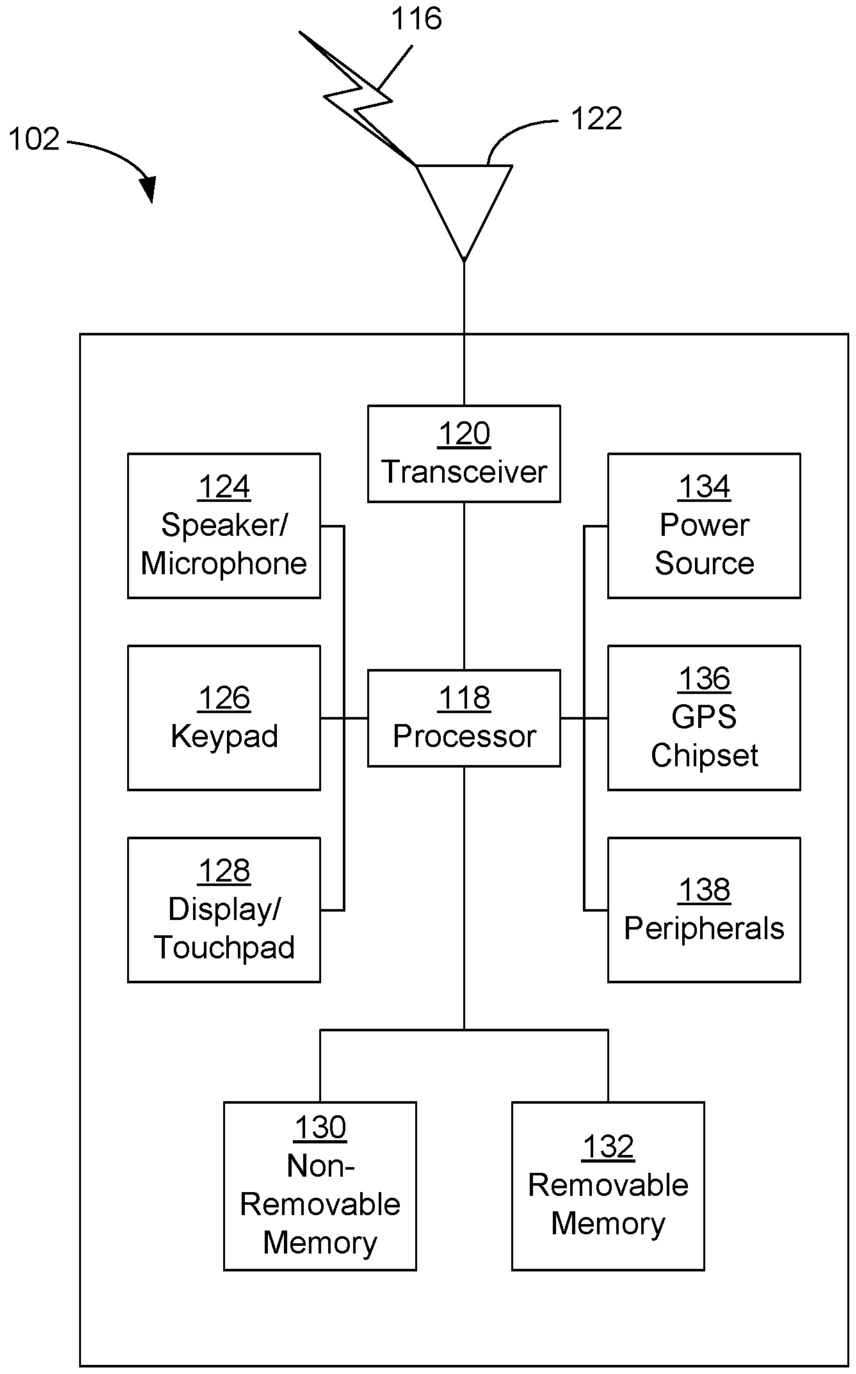
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception).

Figure 1C:
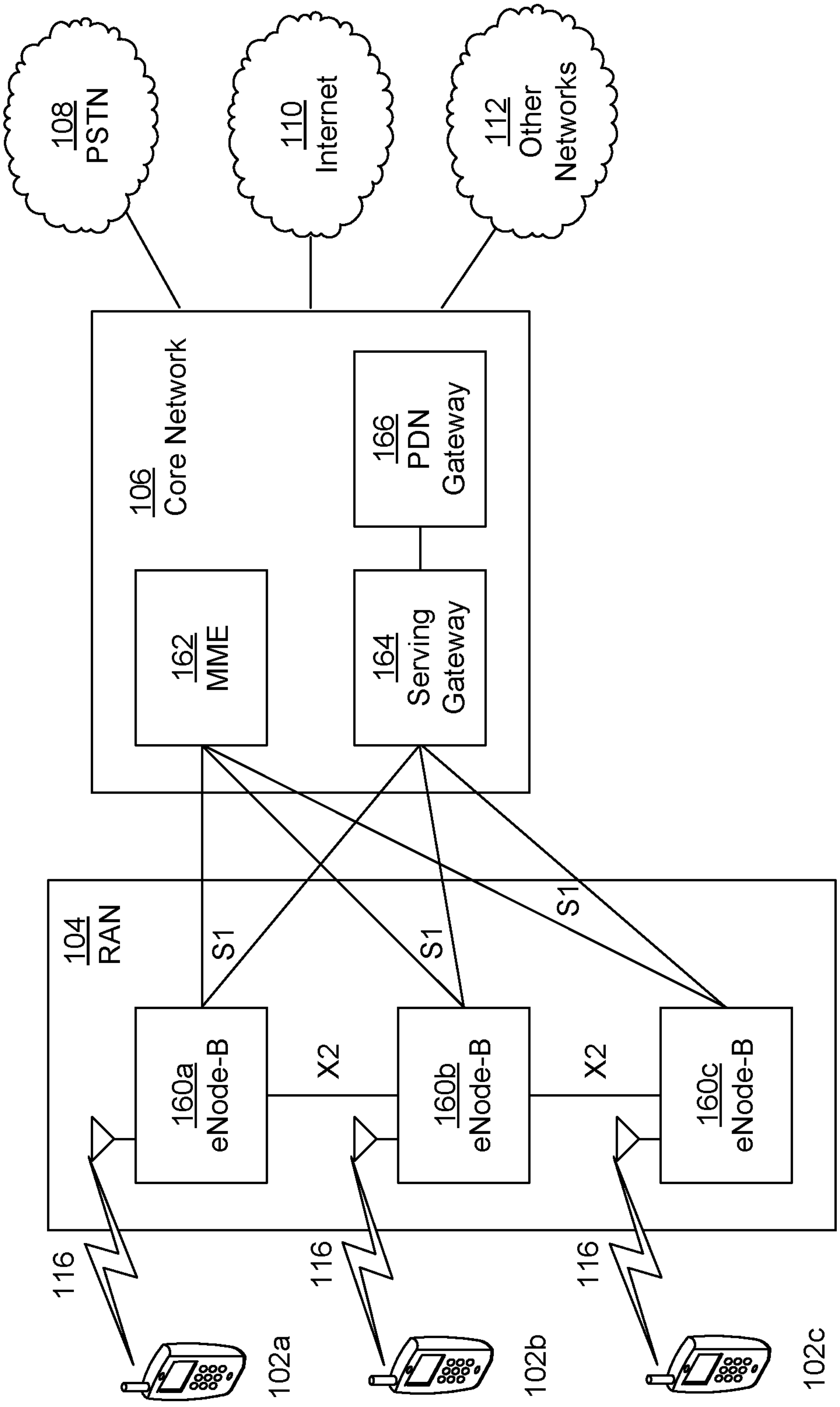
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
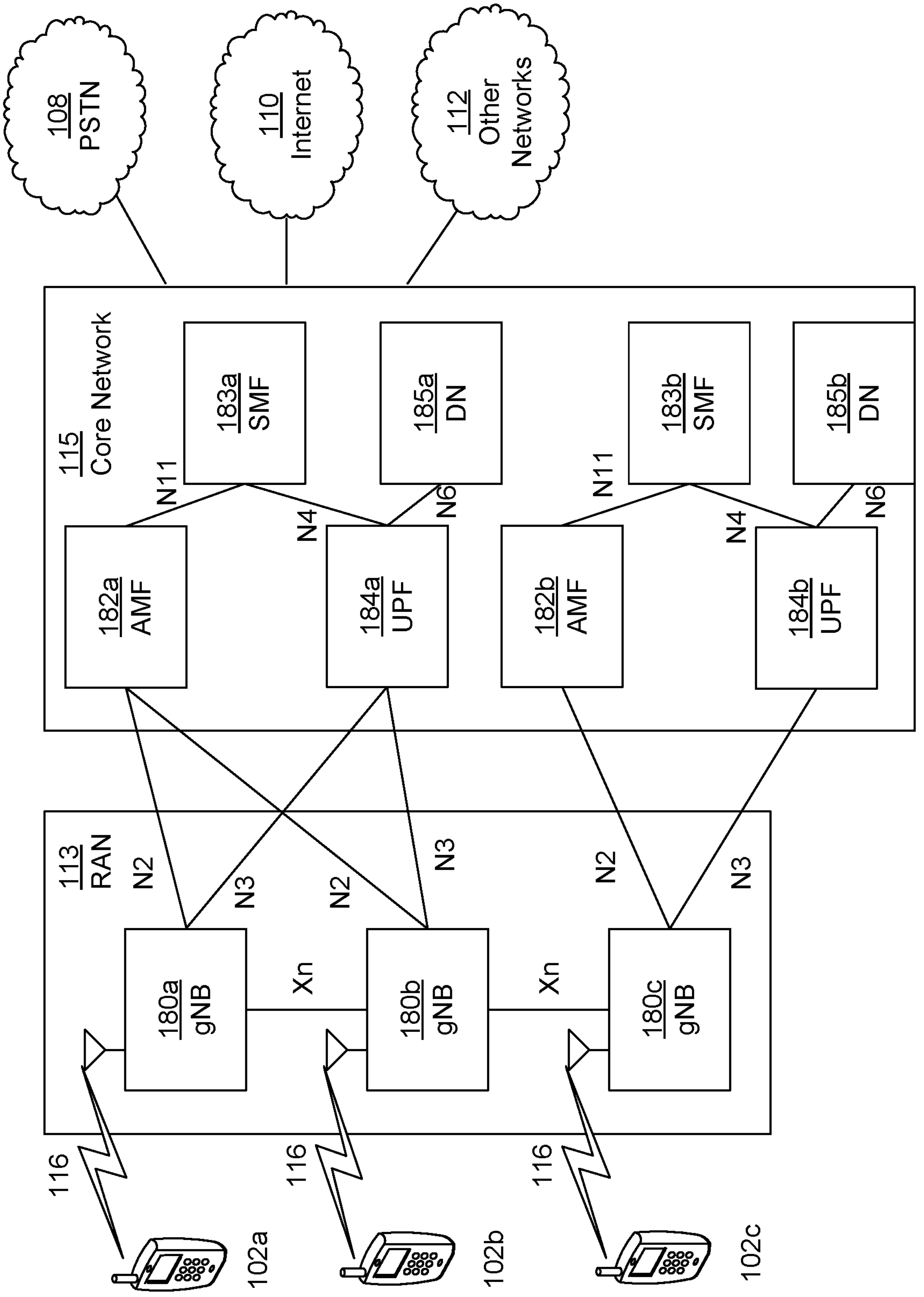
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182_a_, 182_b_ and the like. As shown in FIG. 1D, the gNBs 180_a_, 180_b_, 180_c_ may communicate with one another over an Xn interface.

The CN 115 shown in FIG. 1D may include at least one AMF 182_a_, 182_b_, at least one UPF 184_a_, 184_b_, at least one Session Management Function (SMF) 183_a_, 183_b_, and possibly a Data Network (DN) 185_a_, 185_b_. While each of the foregoing elements are depicted as part of the CN 115, it will be appreciated that any of these elements may be owned and/or operated by an entity other than the CN operator.

The AMF 182_a_, 182_b_ may be connected to one or more of the gNBs 180_a_, 180_b_, 180_c_ in the RAN 113 via an N2 interface and may serve as a control node. For example, the AMF 182_a_, 182_b_ may be responsible for authenticating users of the WTRUs 102_a_, 102_b_, 102_c_, support for network slicing (e.g., handling of different PDU sessions with different requirements), selecting a particular SMF 183_a_, 183_b_, management of the registration area, termination of NAS signaling, mobility management, and the like. Network slicing may be used by the AMF 182_a_, 182_b_ in order to customize CN support for WTRUs 102_a_, 102_b_, 102_c_ based on the types of services being utilized WTRUs 102_a_, 102_b_, 102_c_. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183_a_, 183_b_ may be connected to an AMF 182_a_, 182_b_ in the CN 115 via an N11 interface. The SMF 183_a_, 183_b_ may also be connected to a UPF 184_a_, 184_b_ in the CN 115 via an N4 interface. The SMF 183_a_, 183_b_ may select and control the UPF 184_a_, 184_b_ and configure the routing of traffic through the UPF 184_a_, 184_b_. The SMF 183_a_, 183_b_ may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184_a_, 184_b_ may be connected to one or more of the gNBs 180_a_, 180_b_, 180_c_ in the RAN 113 via an N3 interface, which may provide the WTRUs 102_a_, 102_b_, 102_c_ with access to packet-switched networks, such as the Internet 110, to facilitate communications between the WTRUs 102_a_, 102_b_, 102_c_ and IP-enabled devices. The UPF 184, 184_b_ may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102_a_, 102_b_, 102_c_ with access to the other networks 112, which may include other wired and/or wireless networks that are owned and/or operated by other service providers. In one embodiment, the WTRUs 102_a_, 102_b_, 102_c_ may be connected to a local Data Network (DN) 185_a_, 185_b_ through the UPF 184_a_, 184_b_ via the N3 interface to the UPF 184_a_, 184_b_ and an N6 interface between the UPF 184_a_, 184_b_ and the DN 185_a_, 185_b_.

In view of FIGS. 1A-1D, and the corresponding description of FIGS. 1A-1D, one or more, or all, of the functions described herein with regard to one or more of: WTRU 102_a-d_, Base Station 114_a-b_, eNode-B 160_a-c_, MME 162, SGW 164, PGW 166, gNB 180_a-c_, AMF 182_a-b_, UPF 184_a-b_, SMF 183_a-b_, DN 185_a-b_, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are described herein in association with group sparsity and implicit regularization for MIMO channel estimation. For example, a channel matrix (e.g., MIMO channel matrix) may have a group sparse property and/or a low-rank property. The group sparse property and/or low-rank property may be used in channel estimation applications. For example, the group sparse property and/or low-rank property in MIMO channel matrices may be used with non-convex operations to perform matrix completion. Matrix completion may be performed to determine an unknown channel matrix, for example, using limited entries (e.g., noisy entries).

For example, a wireless transmit/receive unit may reconstruct an unknown channel matrix. The WTRU may receive an indication indicating a value (e.g., noisy entry) associated with the unknown channel matrix. The indication may be received from a reference signal, such as a de-modulation reference signal (DMRS) or a channel state information reference signal (CSI-RS). The WTRU may determine a group sparse matrix based on the indicated value. The WTRU may determine a reconstructed channel matrix, for example, using a non-convex operation and the group sparse matrix. The non-convex operation may be a gradient descent operation. The non-convex operation may be associated with implicit regularization. The WTRU may send information associated with the reconstructed channel matrix. The information may be a CSI parameter. The CSI parameters may be a rank indicator, a precoder matrix indicator (PMI), a channel quality indicator (e.g., CQI), and/or the like.

Channel estimation may be performed, for example, in wireless systems (e.g., in MIMO wireless systems). A channel H may be defined as an $N_r \times N_t$ matrix (e.g., the matrix may be associated with the downlink channel between a WTRU and a base station). The entries in the channel H matrix may be estimated. $N_t$ and $N_r$ may represent the number of antennas at the transmitter and receiver respectively.

A device (e.g., WTRU) may obtain a noisy estimate (e.g., a value) of one or more entries of an unknown channel matrix (e.g., the WTRU may receive configuration information indicating matrix factors, a dimensionality associated with each matrix factor, and/or an initialization for each matrix factor), for example, using/measuring signal(s) (e.g., received from a base station) such as reference signal(s) (e.g., de-modulation reference signal(s) (DMRS), channel state information reference signal(s) (CSI-RS), etc.). The matrix (e.g., the entire matrix, the entire unknown channel matrix) may be reconstructed (e.g., based on a matrix factorization structure associated with the matrix and the matrix factors), for example, using the known noisy entries (e.g., obtained values). For example, a device (e.g., at a receiver R1) may receive a reference signal (e.g., transmitted from an antenna T1 over a sub-carrier S1 at a time n1). The channel matrix for the antenna pair (e.g., T1-R1 antenna pair) may be estimated (e.g., at time n1 and subcarrier S1). The received reference signal (e.g., received at R1) may be affected by noise. The channel matrix may be reconstructed using the signal affected by the noise (e.g., noisy estimate).

Figure 2:
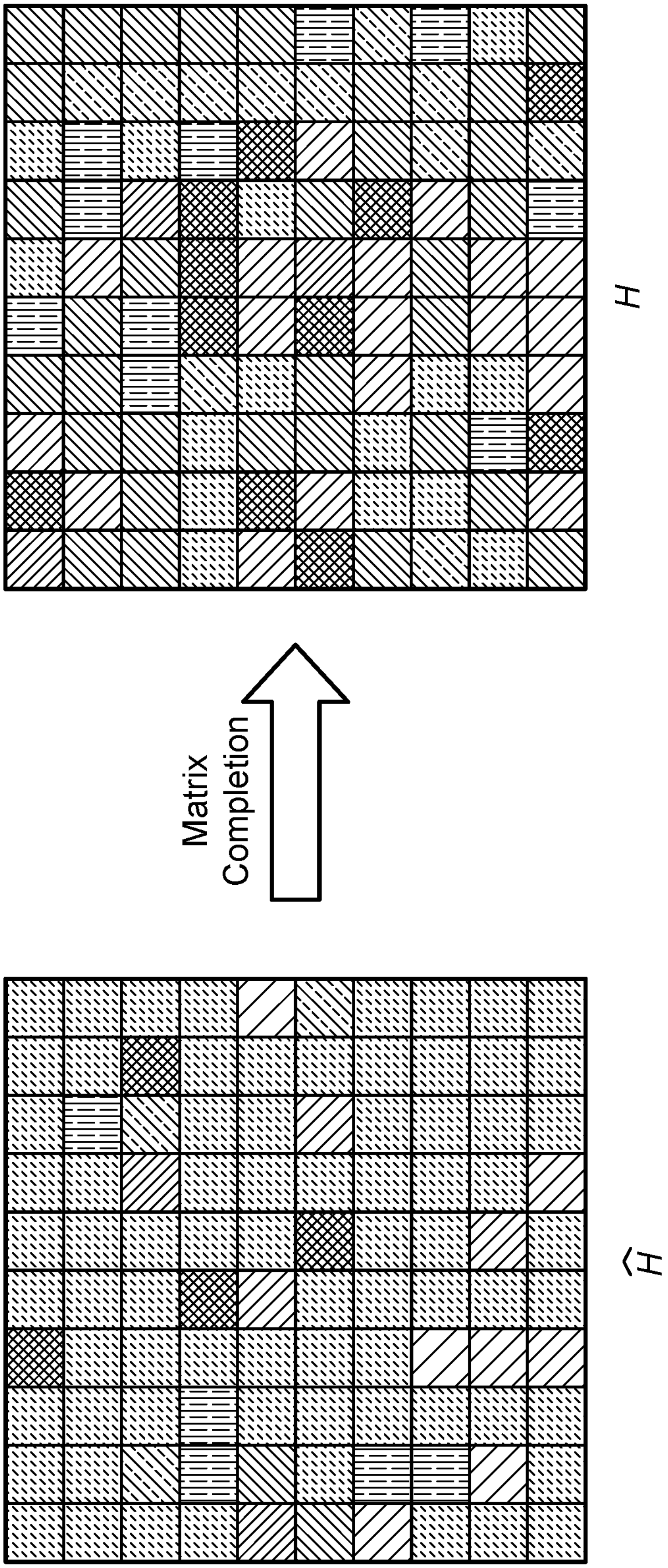
FIG. 2 illustrates entries of a channel matrix and a reconstructed channel matrix.

FIG. 2 illustrates entries of a channel matrix and a reconstructed channel matrix. As shown in FIG. 2, the matrix $\hat{H}$ may contain the noisy estimate of few entries of a channel matrix. As shown in FIG. 2, the matrix H may be the reconstructed matrix, for example, which may be reconstructed from matrix $\hat{H}$. A MIMO channel matrix may be (e.g., have a MF structure that is) low-rank (e.g., generally low-rank) and may be (e.g., have a MF structure that is) sparse (e.g., in the DFT basis). Matrix completion (MC) methods that leverage the low-rank and matrix sparsity information can be utilized, for example, in performing channel estimation.

Non-convex techniques (e.g., non-convex operations) may be used in matrix completion. The non-convex operations may refrain from using (e.g., may not use, may not require) regularization (e.g., explicit regularization), for example, unlike approaches where the low rank or sparsity constraints may be imposed (e.g., explicitly imposed) in the MC formulation. Matrix completion may be optimized, for example, using gradient descent. Matrix completion using a certain initialization may output (e.g., be sufficient to ensure) a solution with properties (e.g., desirable properties), for example, without (e.g., any) explicit regularization. Gradient descent (e.g., gradient descent operations) may provide implicit regularization. The matrix completion may use implicit regularization (e.g., that is offered by gradient descent).

A device may use a group sparse property for matrix completion and/or channel estimation (e.g., matrix completion may be performed based on the matrix factorization structure associated with group sparsity). Channel matrices (e.g., MIMO channel matrices) may have a property, such as a group sparse property (e.g., which may be determined based on the matrix factors) as described herein. Channel matrices that are group sparse may be different from an element wise sparsity of the channel matrix in the DFT basis. Using the group sparse property for matrix completion may provide a better channel estimation performance (e.g., as compared with low rank or element-wise sparse formulations).

The group sparse property of channel matrices (e.g., MIMO channel matrices) may be leveraged (e.g., used) for applications beyond channel estimation. For example, beamforming (e.g., in MIMO systems) can use (e.g., leverage, directly leverage) the group sparse structure, e.g., for evaluation (e.g., efficient evaluation) of beamforming components (e.g., analog beamforming components). For example, the group sparse property can be used (e.g., leveraged, directly leveraged) to achieve feedback compression (e.g., CSI feedback compression), which may be a higher degree of CSI feedback compression (e.g., as compared to CSI feedback compression achieved using element-wise sparsity).

Non-convex optimization (e.g., using gradient descent) may be used for matrix completion associated with channel estimation. Matrix completion (e.g., non-convex matrix completion) may use a formulation (e.g., one or more of multiple formulations disclosed herein, such as, for example, Eq. 8), for example, where the formulation can be regularized (e.g., implicitly regularized) for one or more of the following properties: whether the matrix is associated with a low-rank, element-wise sparsity, or group sparsity. A low-rank property of a matrix may indicate that a rank of the matrix is low. The rank may indicate a number of linearly independent rows and/or columns. For example, for a matrix of size N×M, the rank may be rank(A)<min(N,M). Information associated with the rank of a matrix may be used reconstruct a matrix (e.g., determine other entries of the matrix), for example, if the rank of the of the matrix is low (e.g., much less than min(N,M), for example, a threshold less than min(N,M)) and/or if a few entries (e.g., an amount of entries below a threshold) of the matrix is known. For example, in channel estimation (e.g., MIMO channel estimation), channel matrices (e.g., MIMO channel matrices) may have a low rank. Matrix completion based channel estimation may be performed, for example, based on the low-rank property (e.g., of the channel matrix). The formulations for channel estimation may induce characteristics (e.g., different characteristics) in the estimated channel (e.g., low rank, sparsity, etc.), for example, without imposing explicit regularization or constraints.

Low-rank matrix completion may be performed. In examples for channel estimation, the techniques (e.g., for low-rank matrix completion) may use (e.g., rely on exploiting) sparsity and/or low-rank properties of the channel matrix. A channel may be sparse (e.g., assumed to be sparse) in a certain basis. Techniques may be used for sparse recovery, for example, such as $l_1$-norm minimization, orthogonal matching pursuit (OMP), etc. The techniques for sparse recovery may be used to recover the channel matrix. An algorithm (e.g., two stage algorithm) may use a sparsity and/or low rank property of the channel matrix. A joint estimation technique (e.g., using $l_1$-norm and nuclear norm) may be used for channel estimation.

A non-convex problem may be optimized. Optimizing the non-convex problem may use gradient descent, for example, for matrix completion. The non-convex problems may be formulated, for example, by linearizing neural networks. The non-convex problems may be referred to as a deep linear network (e.g., overparametrized deep linear networks). The gradient descent algorithm (e.g., operation) may regularize (e.g., implicitly regularize) the optimization problem towards a minimum (e.g., global minimum) with properties (e.g., desirable properties), for example, such as low-rank or sparsity.

A linear network (e.g., deep linear network) may be used for channel estimation. The group sparsity of the channel matrix may be considered, for example, under a basis transformation (e.g., appropriate basis transformation). Discrete Fourier Transform (DFT) matrices can be used (e.g., as an appropriate basis), for example, for a channel that can be modelled (e.g., via the beamspace model). Group sparsity may be described. Group sparse structure may arise in channel estimation. The problem of group sparsity may be described by the following. x* may be an unknown parameter that is to be estimated. Linear measurements (e.g., a few linear measurements, for example, a number of linear measurements under a threshold) may be obtained (e.g., given) such as $$a_i^T x^* = b_i.$$

x* may be estimated (e.g., using the linear measurements), for example, based on the known matrix $A^T=[a_1, \ldots, a_m]$, and the measurements may be made for and $b^T=[b_1, \ldots, b_m]$. Using these measurements x* may then be estimated. The number of measurements, m may be less than the dimension of x*, for example, which may make the estimation problem ill-posed (e.g., as there could be infinitely many solutions). To overcome the problem, x* may (e.g., be assumed) to have a group sparse structure (e.g., most entries in the matrix are zero, for example, such that a few entries are non-zero, and the non-zero entries may be grouped together, for example, based on a grouping (e.g., order, type, etc.), for example, $$x^* = [x_1^*, x_2^*, \ldots, x_n^*]^T,$$

where, $$x_i^*$$

$\in \mathbb{R}^k$, $\forall$i and (e.g., only) a few of $$x_i^*$$

Figure 3:
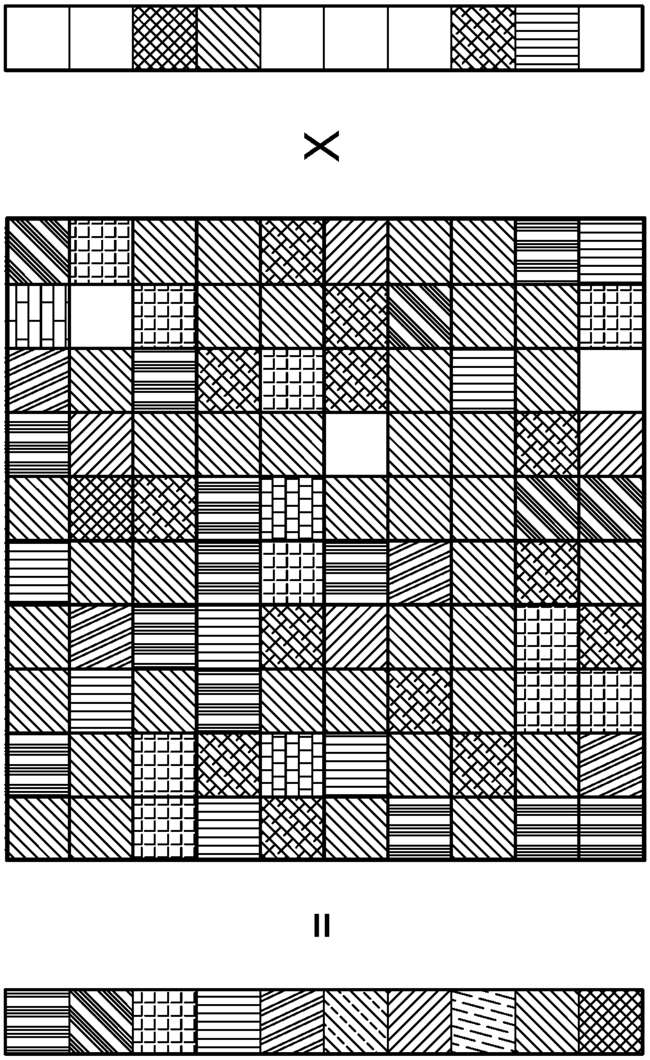
FIG. 3 illustrates an example linear estimation with group sparse structure.

's are non-zero (e.g., as shown in FIG. 3). FIG. 3 illustrates an example linear estimation with group sparse structure. FIG. 3 illustrates a visual description of the equation b=Ax*. As shown in FIG. 3, blank (e.g., white) entries may be zero and the patterned entries may be non-zero.

x* may have non-zero entries (e.g., a few non-zero entries). The non-zero entries may be grouped together. A group sparse vector may be estimated, for example, by solving Eq. 1 (e.g., a convex optimization problem), $$\min_x \sum_{i=1}^n \|x_i\|_2, \text{ s.t.} \sum_{i=1}^n A_i x_i = b \quad \text{Eq. 1}$$

which may be referred to as a minimum $I_{1,2}$ optimization problem.

Group sparse vectors may be estimated, for example, using Eq. 2 (e.g., a non-convex problem), $$\min_{v1,u1} \left\| \sum_{i=1}^n A_i v_i u_i - b \right\|_2^2 \quad \text{Eq. 2}$$

Eq. 2 may be minimized, for example, via gradient descent with a specific initialization. Minimizing Eq. 2 may lead to the following update rules:

$$v_i(0) = \delta > 0,\ u_i(0) = 0 \quad \text{Eq. 3}$$

$$v_i(t) = v_i(t-1) - \eta u_i(t-1)^T A_i^T e(t-1) \quad \text{Eq. 4}$$

$$u_i(t) = u_i(t-1) - \eta v_i(t-1) A_i^T e(t-1) \quad \text{Eq. 5}$$

where $$e(t) = \sum_{i=1}^n A_i v_i(t) u_i(t) - b.$$

The formulae described herein may converge to group sparse vectors without any explicit regularization.

The operations (e.g., as described herein) may be performed in the context of channel estimation. $H\in\mathbb{R}^{N_r x N_t}$ may denote the unknown channel matrix. If the channel matrix follows the beamspace model, the channel matrix may be written as Eq. 6.

$$H = \sum_{k=1}^{N_p} g_k a_r^k(\theta_k) a_t^k(\Phi_k) \quad \text{Eq. 6}$$

$N_p$ may be the number of paths, $g_k$ may be the gain for the $k^{th}$ path, and $$a_r^k \text{ and } a_t^k$$

may be the array response vectors for receivers and transmitters respectively. The array response vectors may depend on the angles k and −k and have the mathematical form as shown in Eq. 7, $$a_k^r(\theta_k) = \begin{bmatrix} 1 & e^{-jc\sin(\theta_k)} & e^{-2jc\sin(\theta_k)} & \ldots & e^{-(N_r-1)jc\sin(\theta_k)} \end{bmatrix} \quad \text{Eq. 7}$$

and similarly for $$a_t^k(\Phi_k).$$

Figure 4B:
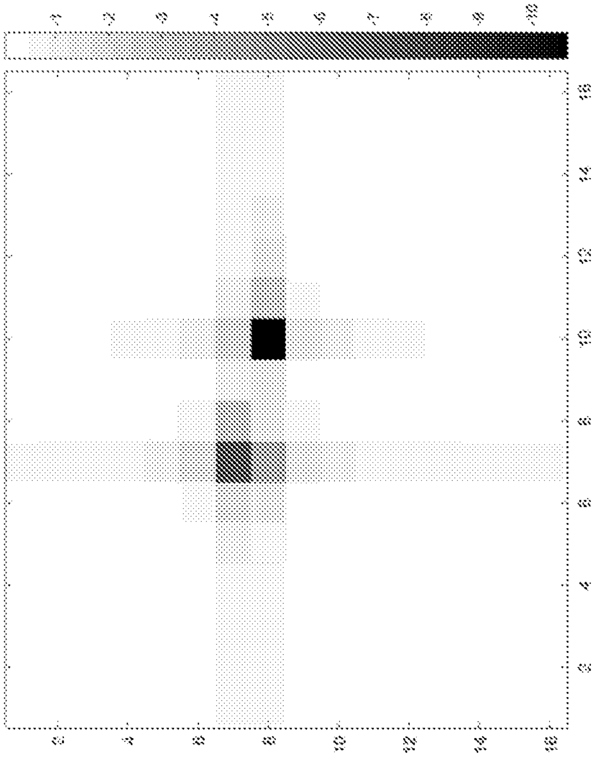
FIG. 4B illustrates an example channel matrix after DFT transformation.
Figure 4A:
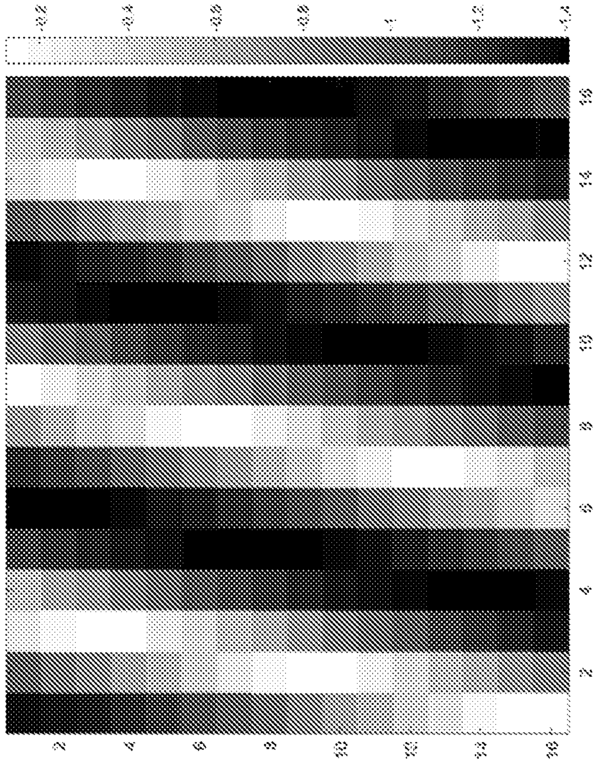
FIG. 4A illustrates an example channel matrix before DFT transformation.

In examples, $$c = \frac{2\pi d}{\lambda}$$

where λ is the wavelength. The array response vectors may be similar to columns of a DFT matrix. An array response vector may be equal (e.g., exactly equal) to a column of the DFT matrix. For example, if c sin($\theta_k$)(c sin($\Phi_k$)) were of the form $$\frac{i}{N_r}\left(\frac{i}{N_t}\right)$$

for some integer i, the corresponding array response vector may be equal (e.g., exactly equal) to a column of the DFT matrix. In examples, if (e.g., all) the array response vectors are equal (e.g., exactly equal) to a column of the DFT matrix, H may be written as $$H = D_r S D_t^H$$

or (e.g., equivalently)

$$S = D_r^H H D_t,$$

where S may be a sparse matrix with an (i; j)$^{th}$ entry that is non-zero, for example, if for some path, k, the array response vectors are the i$^{th}$ and j$^{th}$ column of the DFT matrix. In practice, a scenario (e.g., as described herein where all array response vectors are equal to a column of the DFT matrix) may not occur (e.g., may rarely occur).

$$D_r^H H D_t$$

may remain sparse (e.g., although sparsity may be diffused prominently across the row and column), for example, if (e.g., even if) the array response vectors are not equal (e.g., exactly equal) to a column of the DFT matrix$_i$. FIG. 4A illustrates an example channel matrix before DFT transformation. FIG. 4B illustrates an example channel matrix after DFT transformation. As shown in FIG. 4A, the channel matrix may be H. As shown in FIG. 4B, the channel matrix may be $$D_r^H H D_t.$$

As shown in FIG. 4B, the matrix $$D_r^H H D_t$$

may be sparse (e.g., approximately sparse) across rows and columns.

The matrix H (e.g., the entire matrix H) may be estimated, for example, using (e.g., only) a few entries (e.g., a number of entries below a threshold). The few entries may be selected (e.g., randomly selected or selected based on a pattern, such as a predetermined pattern). For example, a fewer number of entries may increase the difficulty of the problem. For example, given a set of indices, Ω, such that ∀(i,j)∈Ω, a noisy estimate of $H_{i,j}$ may be obtained, for example, which may be denoted by $\hat{H}_{i,j}$. H may be reconstructed, for example, using $\{\hat{H}_{i,j}:(i,j)\in\Omega\}$. Knowledge of the $\hat{H}_{i,j}$ can be modelled, for example, as a linear measurement (e.g., noisy linear measurement) of the unknown matrix H, $$e_j^T,$$

may be group sparse or may be equivalent to a group sparse matrix $$S, D_r^H S D_t = H.$$

Group sparsity may be achieved by implicit regularization (e.g., as described herein). Eq. 8 (e.g., a non-convex problem) may be optimized, for example, using gradient descent.

$$\min_{U\in\mathbb{R}^{N_r x N_t}, v\in\mathbb{R}^{N_r x 1}, w\in\mathbb{R}^{N_t x 1}} \sum_{(i,j)\in\Omega} \left(\left(D_r^H\left(\left(v1_t^T\right)\odot U + \left(1_r w^T\right)\odot U\right)D_t\right)_{i,j} - \hat{H}_{i,j}\right)^2, \quad \text{Eq. 8}$$

$$v(0) = \delta 1_r,\ w(0) = \delta 1_t,\ U(0) = 0$$

where $1_r$ may be a vector where the entries (e.g., all $N_r$ entries) are 1 and $1_t$ may be a vector where the entries (e.g., all $N_t$ entries) are 1. $u_{i,:}$ may be denoted as the i$^{th}$ row of U and $u_{:,j}$ may be denoted as the j$^{th}$ column of U. Then, Eqs. 9 and 10 may be written as the following:

$$\left(v1_r^T\right)\odot U = \begin{bmatrix} v_1 u_{1,:} \\ \vdots \\ v_n u_{n,:} \end{bmatrix} \quad \text{Eq. 9}$$

$$\left(1_r w^T\right)\odot U = [\,w_1 u_{:,1}\ \ \ldots\ \ w_n u_{:,n}\,] \quad \text{Eq. 10}$$

The first term, $$\left(v1_r^T\right)\odot U,$$

⊙U, may result in providing similar form to the rows as x in Eq. 9 for example, which may ensure implicit bias towards sparsity among rows. Similarly, the second term may ensure sparsity across columns.

Figure 5:
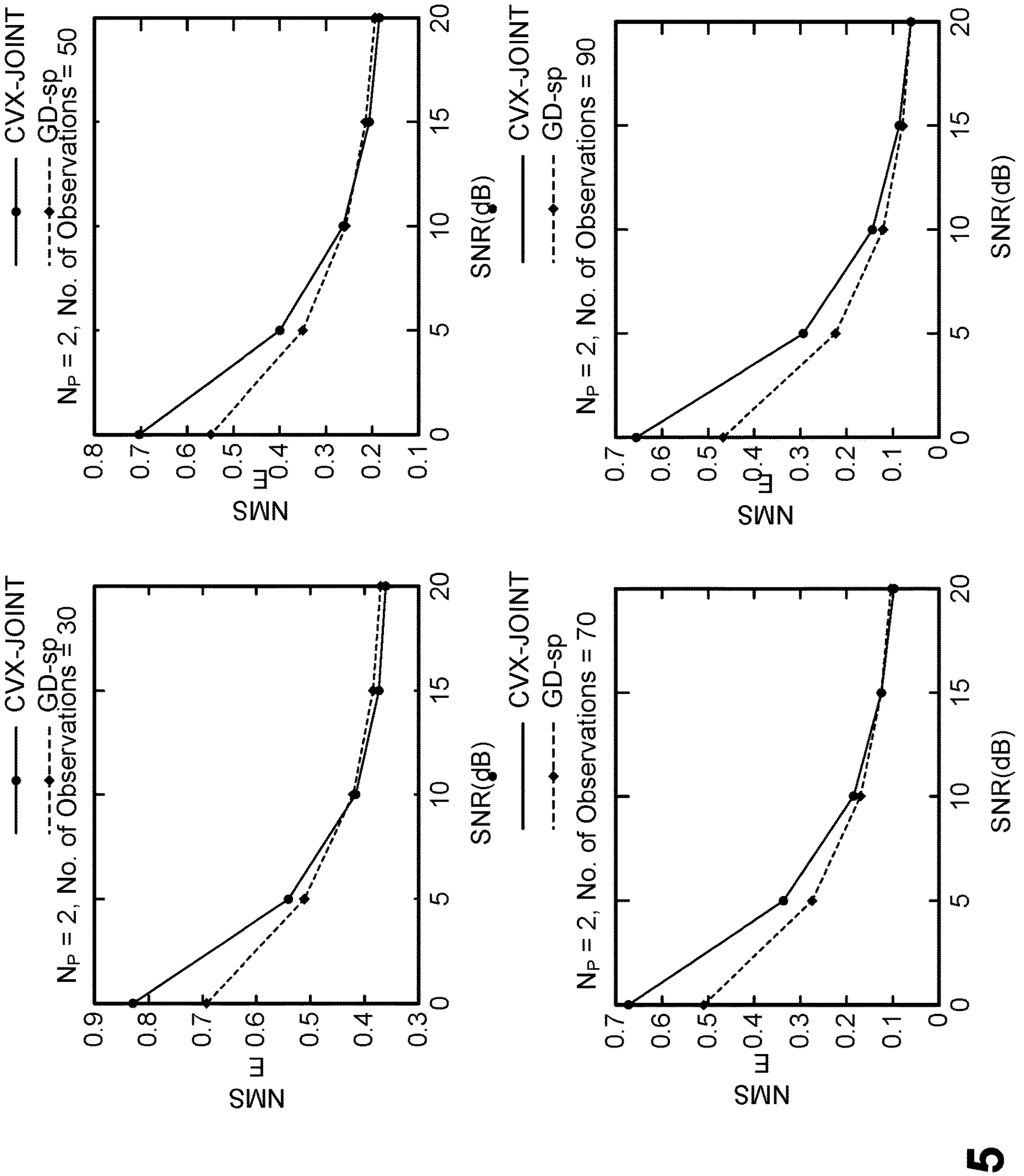
FIG. 5 illustrates an example plot of NMSE versus SNR for various values of observations.

FIG. 5 illustrates an example plot of NMSE versus SNR for various values of observations.

The process (e.g., GD-sp as shown in FIG. 5) used (e.g., as described herein) may be compared against other methods, such as CVX-joint. For example, a scenario may consider a 16×16 MIMO system with two paths. In this case, the channel matrix may have 256 unknown (e.g., complex) entries. As shown in FIG. 5, normalized mean square error (NMSE) versus SNR is plotted for a various number of observations. The number of observations may refer to the number of entries out of 256 that are known (e.g., which are corrupted with noise of a specific signal to noise ratio (SNR)). Both algorithms (e.g., GD-sp and CVX-joint) may perform better as SNR level or number of observations increases. GD-sp may perform better (e.g., as compared to CVX-joint) in the low SNR regime (e.g., for all observations). If the number of observations is less, GD-sp may perform slightly worse than CVX-joint in the high SNR range, for example, but the difference may reduce as number of observations increase.

Figure 6:
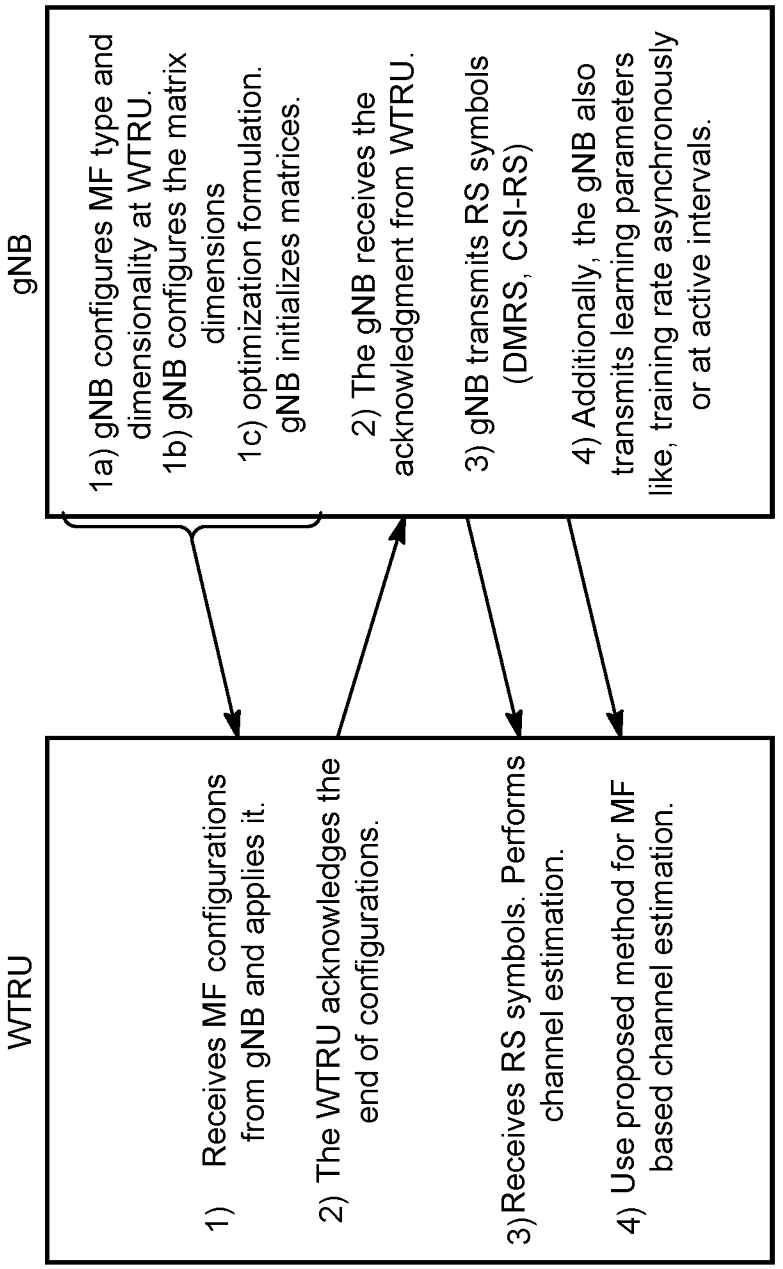
FIG. 6 illustrates an example flow of leveraging matrix properties to perform channel estimation.

FIG. 6 illustrates an example flow of leveraging matrix properties to perform channel estimation. Channel estimation may be a building block, for example, for the downstream processing of the signal at the receiver (e.g., channel estimation may be used for determining channel information and/or channel conditions). The channel estimate may be used for feedback (e.g., CSI feedback or feedback to a base station indicating channel information and/or channel conditions, as shown in FIG. 6) and pre-coder design. For example, channel information and/or channel conditions may be determined (e.g., based on features associated with the channel). Features associated with a channel may be monitored, for example, such as channel rank, delay spread, doppler, and/or the like. A functional mapping may be derived, for example, using ML based methods (e.g., neural networks), for example, instead of monitoring specific features derived from the channel based on prior knowledge or hand crafted features. The functional mapping may map the (e.g., whole) channel matrix to one or more features that are learnt from the data using machine learning. These learnt features can then be monitored in the same way as the hand crafted features. The operations and/or procedures to perform channel estimation (e.g., as described herein and as shown in FIG. 6) may utilize group sparsity in channel matrices towards channel estimation process. As shown in FIG. 6, a WTRU may receive configuration information (e.g., as described herein) indicating matrix factorization type, number of matrix factors, a dimensionality associated with a matrix, and/or the like. As shown in FIG. 6, the WTRU may determine a matrix factorization structure (e.g., based on the channel conditions like rank, etc.) and leverage the structure (e.g., such as group sparse and/or low rank) to perform channel estimation (e.g., based on received RS symbols from the base station). For example, the WTRU may indicate (e.g., to the base station) that the WTRU is configured to perform channel estimation based on the matrix factorization structure (e.g., determined based on the matrix factors, as described herein) associated with the matrix (e.g., as shown in FIG. 6). The group sparse property in channel matrices (e.g., MIMO channel matrices) may provide a more accurate representation to define the channel matrices (e.g., as compared to the element wise sparse or low rank representations that may be commonly used).

The group sparse representation of channel matrices may be applied to applications beyond channel estimation. For example, the group sparse structure can be used (e.g., leveraged) towards evaluating the analog beamforming vectors (e.g., in hybrid beamforming). For example, the group sparse structure can be used (e.g., leveraged, directly leveraged) in association with CSI compression.

The operations and/or procedures to perform channel estimation (e.g., as described herein) may be used without (e.g., does not require) prior information (e.g., any prior information) about the data, for example, unlike other machine learning or deep learning approaches. The operations and/or procedures to perform channel estimation (e.g., as described herein) may be used without (e.g., does not require) parameter tuning (e.g., any painstaking parameter tuning), for example, which may be used (e.g., required) by other optimization strategies. The operations and/or procedures to perform channel estimation (e.g., as described herein) may be feasible for practical deployment.

A parameter (e.g., CSI parameter) may be associated with a channel (e.g., channel matrix, reconstructed channel matrix). The parameter may include, for example, a rank indicator, a precoder matrix indicator (PMI, a channel quality indicator (CQI), and/or the like. The parameter (e.g., CSI parameter) may be dependent on the channel matrix (e.g., reconstructed channel matrix). The parameter (e.g., CSI parameter) may be sent as feedback, for example, to a base station (e.g., in downlink). The parameter (e.g., CSI parameter) may change, for example, if the channel matrix changes (e.g., the WTRU may determine that a channel condition is changing, for example, based on a change in a parameter (e.g., change in a parameter beyond a specific threshold)). For example, feature(s) of a channel (e.g., parameter(s) associated with a channel) may be monitored. A function of the channel features may be monitored. A WTRU may determine that a channel condition has changed (e.g., that a change has occurred in the channel condition compared to a previous value of the channel condition, for example a change that is more than a threshold value). For example, if a function of a channel feature is determined to be changed by more than a threshold value, the WTRU may determine that the channel condition has changed. The value of the parameters or the absolute value of the change to these parameters or the rate of change of these parameters over a threshold may be utilized to ascertain the change in channel conditions.

In examples, the reconstructed channel matrix may be sent, for example, to the base station. The reconstructed channel matrix may be sent as feedback.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU) comprising:

a processor configured to:

receive configuration information from a base station, wherein the configuration information indicates matrix factors associated with a matrix, a first dimensionality associated with a first matrix factor in the matrix and a second dimensionality associated with a second matrix factor in the matrix, and a first initialization for the first matrix factor in the matrix and a second initialization for the second matrix factor in the matrix, and wherein the matrix is associated with a downlink channel between the WTRU and the base station;

determine, based on the matrix factors, a matrix factorization (MF) structure associated with the matrix, wherein the MF structure is associated with a matrix property, and wherein the MF structure is at least a first structure or a second structure; and send an indication to the base station that indicates the WTRU is configured to perform channel estimation based on the MF structure associated with the matrix.

2. The WTRU of claim 1, wherein the processor is further configured to:

receive a reference signal (RS) transmission on a symbol; and perform the channel estimation using the received RS and the MF structure, wherein the channel estimation comprises matrix completion using a non-convex operation, and wherein the matrix completion using the non-convex operation is performed based on the MF structure and the respective dimensionality associated with each matrix factor in the matrix.

3. The WTRU of claim 2, wherein the non-convex operation is associated with gradient descent.

4. The WTRU of claim 2, wherein the symbol is a de-modulation reference signal symbol or a channel state information symbol.

5. The WTRU of claim 2, wherein the channel estimation is further performed based on the initialization for each matrix factor in the matrix.

6. The WTRU of claim 2, wherein the processor is further configured to:

determine a channel condition associated with the downlink channel between the WTRU and the base station;

determine that the channel condition associated with the downlink channel between the WTRU and the base station is changing based on the determined channel condition; and send an indication to the base station indicating the channel condition.

7. The WTRU of claim 1, wherein the first structure is a low rank structure, and wherein the second structure is a group sparse structure.

8. The WTRU of claim 1, wherein the processor is further configured to:

obtain channel information associated with the downlink channel between the WTRU and the base station;

determine to use MF based on the obtained channel information; and based on the determination to use MF, send an indication to the base station indicating the obtained channel information.

9. A method comprising:

receiving configuration information from a base station, wherein the configuration information indicates matrix factors associated with a matrix, a first dimensionality associated with a first matrix factor in the matrix and a second dimensionality associated with a second matrix factor in the matrix, and a first initialization for the first matrix factor in the matrix and a second initialization for the second matrix factor in the matrix, and wherein the matrix is associated with a downlink channel between a wireless transmit/receive unit (WTRU) and the base station;

determining, based on the matrix factors, a matrix factorization (MF) structure associated with the matrix, wherein the MF structure is associated with a matrix property, and wherein the MF structure is at least a first structure or a second structure; and sending an indication to the base station indicating the WTRU is configured to perform channel estimation based on the MF structure associated with the matrix.

10. The method of claim 9, and wherein the method further comprises:

receiving a reference signal (RS) on a symbol; and performing the channel estimation using the received RS and the MF structure, wherein the channel estimation comprises matrix completion using a non-convex operation, wherein the matrix completion using the non-convex operation is performed based on the MF structure and the respective dimensionality associated with each matrix factor in the matrix, and wherein the channel estimation is performed based on the initialization for each matrix factor in the matrix.

11. The method of claim 10, wherein the non-convex operation is associated with gradient descent.

12. The method of claim 10, wherein the symbol is a de-modulation reference signal symbol or a channel state information symbol.

13. The method of claim 10, wherein the channel estimation is further performed based on the initialization for each matrix factor in the matrix.

14. The method of claim 10, wherein the method further comprises:

determining a channel condition associated with the downlink channel between the WTRU and the base station;

determining that the channel condition associated with the downlink channel between the WTRU and the base station is changing based on the determined channel condition; and sending an indication to the base station indicating the channel condition.

15. The method of claim 9, wherein the first structure is a low rank structure, and wherein the second structure is a group sparse structure.

16. The method of claim 9, wherein method further comprises:

obtaining channel information associated with the downlink channel between the WTRU and the base station;

determining to use MF based on the obtained channel information; and based on the determination to use MF, sending an indication to the base station indicating the obtained channel information.

* * * * *